J. O. LUTHY.
PLATE FOR SECONDARY BATTERIES.
APPLICATION FILED JULY 7, 1914.

1,141,251.

Patented June 1, 1915.

Witnesses.

Inventor.
Joseph O. Luthy

UNITED STATES PATENT OFFICE.

JOSEPH O. LUTHY, OF SAN ANTONIO, TEXAS.

PLATE FOR SECONDARY BATTERIES.

1,141,251.

Specification of Letters Patent. Patented June 1, 1915.

Application filed July 7, 1914. Serial No. 849,389.

*To all whom it may concern:*

Be it known that I, JOSEPH O. LUTHY, a citizen of the Republic of Switzerland, residing in the city of San Antonio, county of Bexar, State of Texas, have invented certain new and useful Improvements in Plates for Secondary Batteries; and I do hereby declare the following to be a full, clear, and exact description of the invention, such as will enable others skilled in the art to which it appertains to make and use the same.

The object of the invention is to provide a durable and efficient form of plate or electrode for storage batteries, in which the active material carried by the conducting grid will be protected from displacement and disintegration by means of an inherently and practically uniformly porous enamel-like coating applied to the exposed surfaces of the electrode, which coating may, if desired, be associated with and reinforced by open-work screens attached to the lateral faces of the supporting grid of the electrode.

Figure 1:
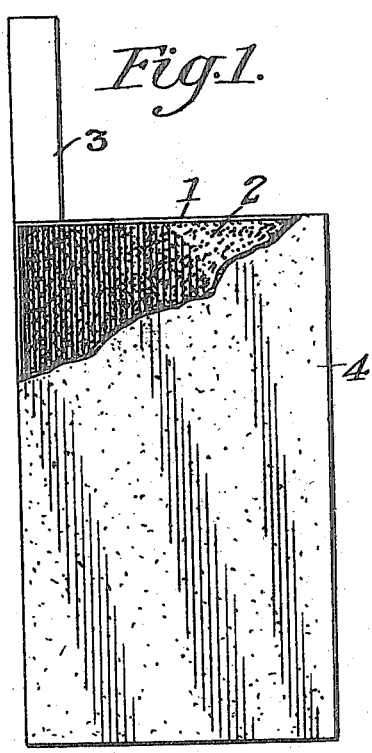
Figure 2:
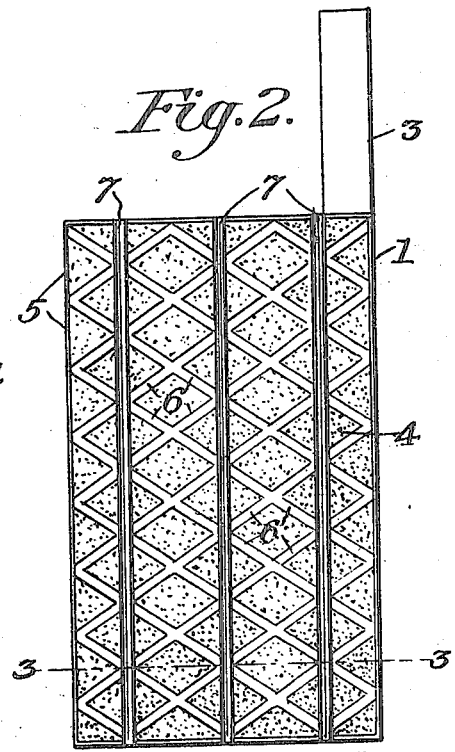
Figure 3:
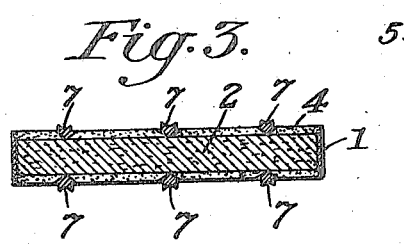
Figure 4:
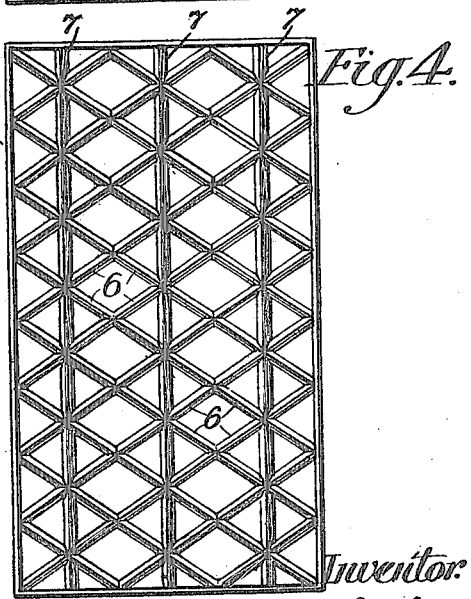

The invention is illustrated in the accompanying drawing, in which,

Figure 1 is a vertical elevation of a secondary or storage battery plate or electrode having the protecting coating applied thereto. Fig. 2 is a similar view showing an open-work screen associated with a protective coating and secured to the electrode grid. Fig. 3 is a horizontal section through the body of the plate shown in Fig. 2. Fig. 4 is a rear elevation of one of the screens.

In the construction and use of secondary batteries, involving foraminous grids of lead and the like to which the active material is applied in the form of a paste, much difficulty is experienced in maintaining the active material intact, inasmuch as the operations of alternately charging and discharging the battery tends to loosen the active material from the grid and to disintegrate and disrupt such active material to such an extent as to render the apparatus practically useless until repaired. I have found that by covering a battery plate or electrode with a suitable porous enamel-like coating, the tendency of the active material to break away from the grid is practically obviated, while the electrical efficiency of the apparatus is in no wise impaired. It has also been demonstrated that by associating the porous enamel-like coating with a suitable open-mesh screen, attached to the grid of the electrode, the coating itself is materially reinforced and the composite electrode covering, formed by the porous enamel and the reinforcing screen effectively prevents any disruption or disintegration of the active material, or the separation of the same from the grid, but, on the contrary maintains the active material intact and in intimate contact with the grid, under all normal conditions of use.

Referring to the drawings, 1 indicates the ordinary foundation grid of an electrode or storage battery plate, which may be of any of the ordinary and well known forms, to which is applied the active material 2 usually in the form of a paste which completely fills the interstices or recesses in the body of the grid. In applying one phase of the present invention to electrodes or storage battery plates of the character indicated, a suitable composition is prepared in such form that it may be applied like paint or enamel, either by means of a brush, or by dipping, to completely cover the portion of the electrode which carries the active material, the composition being of such a character that when dried, it forms an inherently highly porous enamel-like coating, which adheres closely to the surface of the electrode and is not readily broken or detached. The application of such a coating to the surface of the electrode is indicated at 4 in Fig. 1, the upper portion of the coating being broken away to indicate the general character thereof, as well as to show the underlying surface of the electrode. An efficient, cheap and readily prepared coating of the character indicated consists of pulverized pumice-stone and silicate of soda, which are mixed together until they form a paint-like composition which, as indicated, may be applied to the plates or electrodes with a brush or by dipping the electrodes in the semi-liquid composition. If one application of the composition is not found sufficient, the coated plates are set aside to dry for a reasonable time and are then subsequently given one or more additional applications of the coating until the latter attains the desired consistency and thickness. Preferably, each applied coat is dried before the next is added. In order to render this enamel coating harder and more durable, and to increase the porosity thereof, the coated plates may be subjected to heat, either by direct application of a flame or by baking in a suitable oven.

Tests made with secondary cells having plates or electrodes coated with the porous enamel of the character indicated show that this coating is of very low electrical resistance, is so highly porous as not to interfere with the access of the electrolyte to the active material of the electrodes, does not decrease the efficiency of the cell to any appreciable degree either in charging or discharging and above all renders the electrodes practically immune to the disrupting influences which tend to break away and separate the active materials from their supporting grids.

In order to still further increase the efficiency and protective effect of the porous enamel-like coating, it has been found advantageous to associate therewith a foraminous or open-work screen which may be attached directly to the lateral face of the electrode grid so that when the coating is applied, it will cover the screen, fill the interstices or foramina thereof and itself be materially reinforced by the elements of the screen. It will be understood, of course, that a screen is applied to each lateral face of the electrode, and if desired, the screen may be so formed as to practically surround the electrode. A simple form of screen is illustrated in Figs. 2, 3 and 4 of the drawings, in which the said screen is shown as involving a rectangular framework 5, having lattice-like cross pieces 6 formed integrally therewith and provided with vertical ribs or stays 7. The rear faces of the cross bars 6 and vertical stays 7 are beveled or inclined so that when the screen is applied to the face of an electrode, the cross bars 6 and the vertical stays 7 form a series of pockets with outwardly converging walls which serve to lock and retain the enamel-like coating rigidly in position and also effectively resist any tendency of the active material of the grids to be forced outwardly. Preferably the screen is formed of lead either by casting in suitable molds or by pressing it from sheets. When so formed, the screens may be secured at appropriate intervals to the faces of the electrode grids by spot welding or by soldering, and when so applied, the screens materially lower the resistance of the electrodes, increase the mechanical strength of the supporting grid, form pockets, as aforesaid, to retain the active material in contact with the supporting grid and serve as a reinforce for the porous, enamel-like coating. The outer faces of the ribs or stays 7 of the screen are preferably extended beyond the normal level of the screen plates and are provided with shallow channels or grooves which are adapted to carry insulating spacers to separate adjusting plates, which spacers may take the form of rubber strips or tubes, wooden rods, or the like.

When provided with a porous enamel-like coating and reinforced with screens overlying the active material and embedded in the enamel-like coating, the battery plate or electrode is practically indestructible under all normal conditions of use and preserves its general efficiency unimpaired.

What I claim is:—

1. An electrode for secondary batteries including a supporting grid with a filling of active material and an inherently porous enamel-like coating enveloping the electrode.

2. An electrode for secondary batteries including a supporting grid with a filling of active material and a porous enamel-like coating consisting of pulverized pumice-stone and silicate of soda.

3. An electrode for secondary batteries including a supporting grid with a filling of active material, a foraminous screen covering the face of said electrode and an inherently porous enamel-like coating applied to said screen.

4. An electrode for secondary batteries including a supporting grid with a filling of active material, a foraminous conducting screen covering the face of said electrode and an inherently porous enamel-like coating applied to said screen.

5. An electrode for secondary batteries including a supporting grid with a filling of active material, a foraminous screen covering the face of said electrode and a porous enamel-like coating consisting of pulverized pumice-stone and silicate of soda applied to said screen.

6. An electrode for secondary batteries including a supporting grid with a filling of active material, foraminous screens attached to opposite faces of said grid and an inherently porous enamel-like coating applied to said screens.

7. An electrode for secondary batteries including a supporting grid with a filling of active material, an inherently porous enamel-like coating applied to the faces of said electrode, and a metallic screen embedded in and reinforcing said coating.

8. An electrode for secondary batteries including a supporting grid with a filling of active material, a porous enamel-like coating consisting of pulverized pumice-stone and silicate of soda applied to the faces of said electrode, and a metallic screen embedded in and reinforcing said coating.

In testimony whereof I affix my signature, in presence of two witnesses.

JOSEPH O. LUTHY.

Witnesses:
 YALE HICKS,
 B. W. TEAGARDEN.